(12) United States Patent
Tokumochi

(10) Patent No.: US 8,666,563 B2
(45) Date of Patent: Mar. 4, 2014

(54) DETERMINATION APPARATUS FOR DETERMINING ERRONEOUS APPLICATION OF ACCELERATOR RATHER THAN BRAKE

(75) Inventor: Daisuke Tokumochi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/343,131

(22) Filed: Jan. 4, 2012

(65) Prior Publication Data

US 2012/0179304 A1   Jul. 12, 2012

(30) Foreign Application Priority Data

Jan. 6, 2011   (JP) .................................. 2011-001365

(51) Int. Cl.
   *G06F 17/00* (2006.01)
   *B60T 7/12* (2006.01)
   *B60K 28/14* (2006.01)
   *B60K 28/00* (2006.01)

(52) U.S. Cl.
   USPC ............... 701/1; 180/272; 180/274; 180/282; 701/45

(58) Field of Classification Search
   USPC ........... 701/1, 45, 84; 473/132; 180/272, 274, 180/282
   See application file for complete search history.

(56) References Cited

U.S. PATENT DOCUMENTS

| | | | |
|---|---|---|---|
| 5,439,429 A * | 8/1995 | Lee | 477/207 |
| 5,555,499 A * | 9/1996 | Yamashita et al. | 701/84 |
| 6,023,664 A * | 2/2000 | Bennet | 702/141 |
| 7,747,383 B2 * | 6/2010 | Ohkubo et al. | 701/504 |
| 2007/0173984 A1 * | 7/2007 | Nakayama | 701/1 |
| 2007/0178984 A1 * | 8/2007 | Kim | 473/132 |
| 2009/0216408 A1 * | 8/2009 | Ueno | 701/45 |

FOREIGN PATENT DOCUMENTS

| | | |
|---|---|---|
| JP | 1178034 | 7/1989 |
| JP | 2001-208195 | 8/2001 |
| JP | 2003-056371 | 2/2003 |

(Continued)

OTHER PUBLICATIONS

"Motor Vehicle Accident Analysis: Preventing Erroneous Driver Performance", Institute for Traffice Accident Research and Data Analysis, ITARDA Information No. 86, Dec. 2010.*

Office Action issued Sep. 4, 2012 in corresponding Japanese Application No. 2011-001365 with English translation.

(Continued)

*Primary Examiner* — Fadey Jabr
*Assistant Examiner* — Aaron L Troost
(74) *Attorney, Agent, or Firm* — Harness, Dickey & Pierce, PLC

(57) ABSTRACT

A determination apparatus is provided which is installed in a vehicle. A longitudinal acceleration calculation unit obtains acceleration applied in the longitudinal direction of the vehicle, removes an acceleration component corresponding to gravity from the acceleration, and regards the resultant value as longitudinal acceleration. A selection unit selects criteria data, when considering a first case where the absolute value of the longitudinal acceleration is a first value and a second case where the absolute value is a second value larger than the first value, so that a range of accelerator-opening variation by which occurrence of an erroneous application of the accelerator is determined or a range of accelerator-opening by which the occurrence is determined in the second case becomes larger than that in the first case. A determination unit determines the occurrence by applying the current variation in the accelerator-opening or the current accelerator-opening to the selected criteria data.

15 Claims, 5 Drawing Sheets

(56) References Cited

FOREIGN PATENT DOCUMENTS

| JP | 2003-137001 | | 5/2003 |
| JP | 2005-273495 | | 10/2005 |
| JP | 2007-170207 | | 7/2007 |
| JP | 2009-57893 | | 3/2009 |
| JP | 2009-190597 | | 8/2009 |
| JP | 2009/190597 A | * | 8/2009 |

OTHER PUBLICATIONS

Office action dated Dec. 18, 2012 in corresponding Japanese Application No. 2011-001365.
"Motor Vehicle Accident Analysis: Preventing Erroneous Driver Performance", Institute for Traffic Accident Research and Data Analysis, ITARDA Information No. 86, Dec. 2010.
Office Action dated Dec. 17, 2013 in corresponding Japanese Application No. 2011-001365.

* cited by examiner

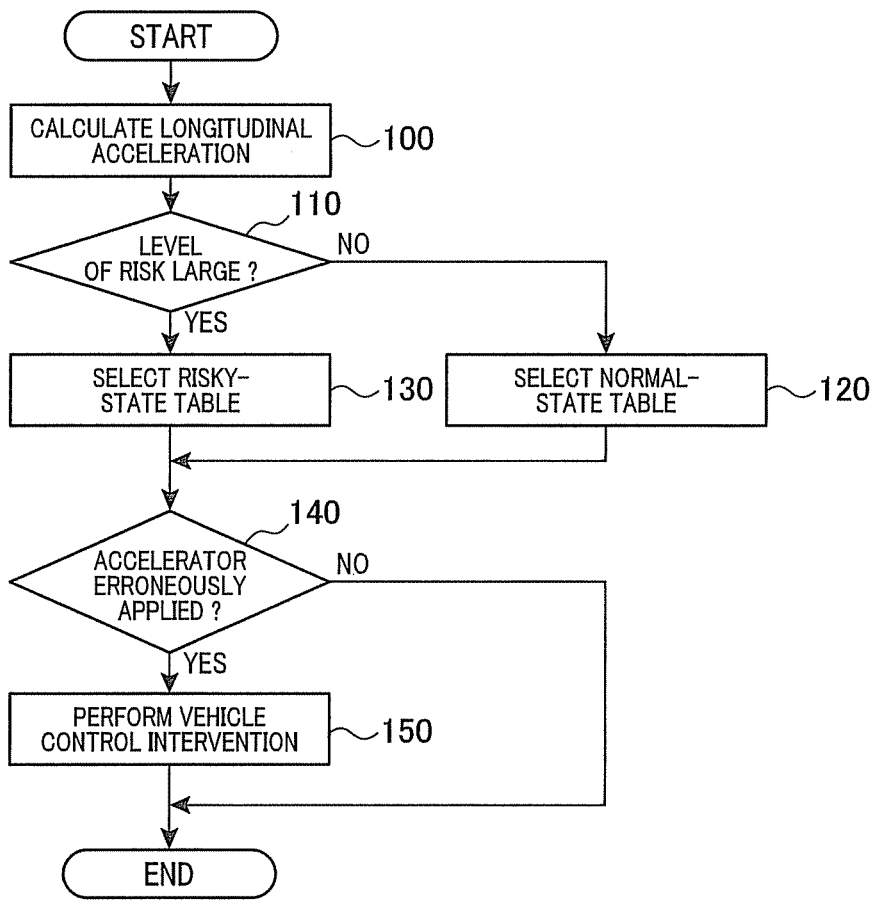
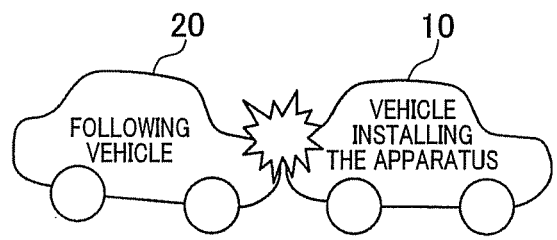

DETERMINATION APPARATUS FOR DETERMINING ERRONEOUS APPLICATION OF ACCELERATOR RATHER THAN BRAKE

CROSS-REFERENCE TO RELATED APPLICATION

This application is based on and claims the benefit of priority from earlier Japanese Patent Application No. 2011-001365 filed Jan. 6, 2011, the description of which is incorporated herein by reference.

BACKGROUND

1. Technical Field

The present invention relates to a determination apparatus which determines the occurrence of an erroneous application of the accelerator rather than the brake.

2. Related Art

It is a well-known technique to detect a vehicle driver's erroneous application of the accelerator rather than the brake and, upon detection of such an erroneous application of the accelerator, to limit the drive force of the vehicle or to apply braking to the vehicle. For example, JP-A-2005-273495 or JP-A-2009-190597 discloses a technique in which the occurrence of an erroneous application of the accelerator is determined based such as on an accelerator opening caused by the driver of the vehicle (pressing force applied to the accelerator by the driver).

However, the technique mentioned above alone may not always necessarily realize accurate detection of an erroneous application of the accelerator.

For example, when a vehicle has an impact from outside, such as by being hit from behind by another vehicle, the driver of the hit vehicle would be shocked and may mistakenly press the accelerator pedal intending to press the brake pedal. Also, in entering a small-radius curve in a vehicle, if the speed of entering the curve becomes higher than the driver's intention, the driver may accidentally press the accelerator pedal rather than the brake pedal.

It is very unlikely that, when a driver is involved in the situations as mentioned above, the driver would intentionally apply the accelerator as in normal traveling. Therefore, in such situations, use of normal criteria for determining erroneous application of the accelerator may lead to the increase of erroneous determination that the accelerator is not being erroneously pressed, although the accelerator is actually being erroneously pressed.

SUMMARY

It is thus desired in a technique of detecting a vehicle driver's erroneous application of the accelerator rather than the brake to more accurately detect such errors than in the conventional art, when the vehicle has an impact from outside or when the vehicle enters a curve.

As an aspect of the embodiment, a determination apparatus is provided which is installed in a vehicle and determines occurrence of an erroneous application of an accelerator, the apparatus including: a longitudinal acceleration calculation unit which obtains acceleration applied in the longitudinal direction of a body of the vehicle based on a signal from a G-sensor installed in the vehicle, removes an acceleration component corresponding to gravity from the obtained acceleration applied in the longitudinal direction, and regards the resultant value as longitudinal acceleration; a selection unit which selects criteria data, when considering a first case where the absolute value of the longitudinal acceleration is a first value and a second case where the absolute value of the longitudinal acceleration is a second value larger than the first value, so that a range of accelerator opening variation by which occurrence of an erroneous application of the accelerator is determined or a range of accelerator opening by which occurrence of an erroneous application of the accelerator is determined in the second case becomes larger than that in the first case; and a determination unit which determines whether or not the accelerator has been erroneously applied, by applying the current variation in the accelerator opening or the current accelerator opening to the selected criteria data.

BRIEF DESCRIPTION OF THE DRAWINGS

In the accompanying drawings:

FIG. 3 is a flow diagram illustrating a process performed by a determination apparatus for determining erroneous application of an accelerator;

FIG. 4 is a schematic diagram illustrating a situation where the vehicle installing the apparatus is hit by the following vehicle;

DETAILED DESCRIPTION OF THE PREFERRED EMBODIMENTS

With reference to the accompanying drawings, hereinafter are described some embodiments of the disclosure.

First Embodiment

Figure 1:
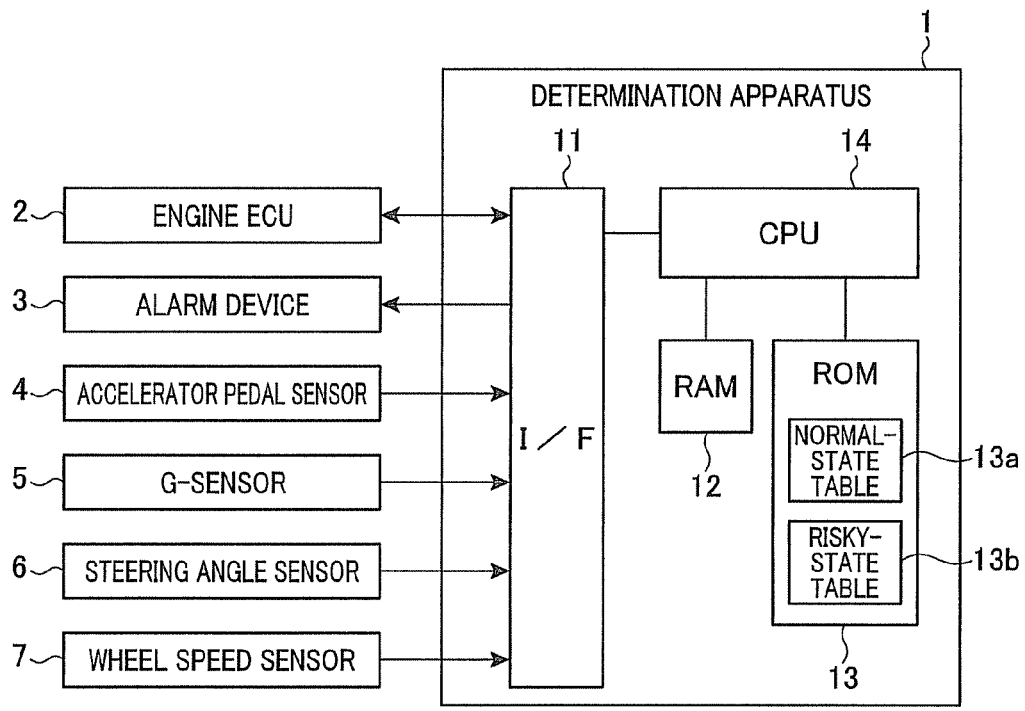
FIG. 1 is a configurational diagram illustrating an on-vehicle system according to a first embodiment.

Referring to FIGS. 1 to 8 first, a first embodiment is described. FIG. 1 is a configurational view illustrating an on-vehicle system according to the first embodiment. The on-vehicle system is installed in an automatic transmission vehicle and includes a determination apparatus 1 for determining erroneous application of the accelerator (hereinafter just referred to as "determination apparatus 1"). The on-vehicle system also includes an engine ECU 2, alarm device 3, accelerator pedal sensor 4, vehicle body gravity sensor 5 (hereinafter just referred to as "G-sensor 5"), steering angle sensor 6 and wheel speed sensor 7.

The determination apparatus 1 detects an erroneous application of the accelerator. Specifically, the determination apparatus 1 detects the fact that a driver of the vehicle has erroneously pressed the accelerator pedal intending to press the brake pedal.

The engine ECU 2 regulates quantity of fuel, for example, to be injected to the engine in response to the accelerator opening of the vehicle to control the operation of the engine. However, the engine ECU 2 of the present embodiment also operates in accordance with the instructions issued from the determination apparatus 1.

The alarm device 3 outputs an alarm sound to the driver in the vehicle cabin under the control of the determination apparatus 1. The accelerator pedal sensor 4 detects an accelerator opening that varies according to the pressing force applied to the accelerator pedal by the driver and outputs the detected accelerator opening.

The G-sensor 5 measures three-dimensional acceleration of the vehicle (i.e. acceleration in the longitudinal direction, the lateral direction and the height direction of the vehicle) and outputs the measured three-dimensional acceleration. Any sensor may be used as the G-sensor 5, such as a sensor of an electrostatic capacitance detection type, a piezoresistance type and a thermal sensing type. It should be appreciated however that the acceleration outputted from the G-sensor 5 includes acceleration components that correspond to gravity.

Figure 2:
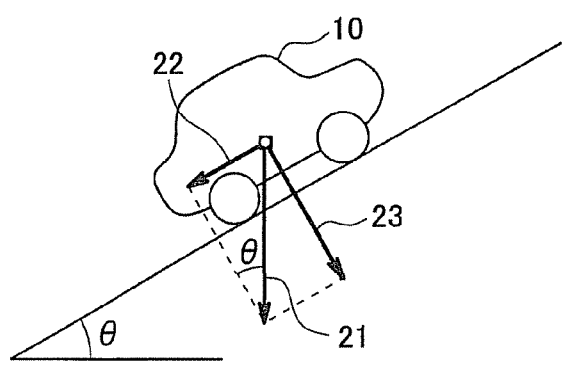
FIG. 2 is a schematic diagram illustrating an influence of a gravitational acceleration on an output of a vehicle body G-sensor.

FIG. 2 is a schematic diagram illustrating an influence of a gravitational acceleration on the output of the G-sensor 5 installed in a vehicle 10. As shown in FIG. 2, for example, when the vehicle 10 is situated on a downslope, the output of the acceleration in the longitudinal direction of the vehicle includes an acceleration component 22 of a gravitational acceleration 21, the component 22 being directed in the direction parallel to the road surface. Also, the output of the acceleration in the height direction of the vehicle includes an acceleration component 23 of the gravitational acceleration 21, the component 23 being directed in the direction perpendicular to the road surface.

The steering angle sensor 6 detects an angle of the steering wheel steered by the driver (steering angle) and outputs the detected steering angle. The wheel speed sensor 7 is provided to each of the wheels of the vehicle to output a vehicle-speed pulse signal which is synchronous with the rotation of the corresponding wheel.

The determination apparatus 1 includes an interface 11, RAM 12, ROM 13 and CPU 14.

The interface 11 is made up of an interface circuit through which signals are transmitted between the CPU 14 and the units 2 to 7 mentioned above. The RAM 12 is a memory for use by the CPU 14 in operation. The ROM 13 is a nonvolatile memory that stores programs or the like executed by the CPU 14.

The ROM 13 stores in advance two tables which are a normal-state table 13a and a risky-state table 13b. The normal-state and risky-state tables 13a and 13b are each a candidate for predetermined criteria data used in determining whether or not an erroneous application of an accelerator has occurred. The details of the normal-state and risky-state tables 13a and 13b including the usage of the tables will be described later.

The CPU 14 as an arithmetic circuit executes the programs stored in the ROM 13. In executing the programs, the CPU 14 uses the ROM 13 as a work area, for the transmission/reception of signals to/from the units 2 to 7 through the interface 11.

FIG. 3 is a flow diagram illustrating a process performed by the CPU 14. The CPU 14 is adapted to repeatedly perform (e.g., periodically, at a cycle of 100 msec) the process of FIG. 3 while the determination apparatus 1 is in operation (e.g., while an ignition switch IG is in an on-state, or while the vehicle is traveling).

In performing the process, the CPU 14 calculates, in step 100, first, an acceleration in the movement of the vehicle body in its longitudinal direction (hereinafter this acceleration is specifically referred to as "longitudinal acceleration"). Specifically, the CPU 14 obtains the current acceleration in the longitudinal direction of the vehicle body from the G-sensor 5 via the interface 11. Then, the CPU 14 removes an acceleration component corresponding to gravity from the obtained acceleration in the longitudinal direction. The value obtained from the removal of the acceleration component is used as the longitudinal acceleration.

More specifically, the current acceleration in the longitudinal direction of the vehicle body as obtained from the G-sensor 5 is indicated by A. An inclination of the road surface directly beneath the vehicle in the longitudinal direction thereof is indicated by $\theta$. Also, a value resulting from the removal of the acceleration component corresponding to gravity is indicated by C. The value C (longitudinal acceleration) is expressed by the following expression:

$$C = A - g \times \sin\theta$$

Accordingly, the longitudinal acceleration C corresponds to an acceleration in the movement of the vehicle body in its longitudinal direction with respect to the road surface.

The acceleration A indicates an amount which will be zero when the vehicle is stopped on a horizontal road, will be a positive value when the vehicle is accelerating in the forward direction on a horizontal road, and will be a negative value when the vehicle is decelerating in the forward direction on a horizontal road. The angle $\theta$ indicates an amount which will be zero when the road surface directly beneath the vehicle is horizontal, will be a positive value when the road surface directly beneath the vehicle is inclined downward with respect to the forward direction of the vehicle, and will be a negative value when the road surface directly beneath the vehicle is inclined upward with respect to the forward direction of the vehicle. The longitudinal acceleration C indicates an amount which will be zero when the vehicle is stopped, will be a positive value when the vehicle is accelerating in the forward direction, and will be a negative value when the vehicle is decelerating in the forward direction. The symbol "g" indicates gravitational acceleration.

The inclination $\theta$ of the road surface directly beneath the vehicle in the longitudinal direction thereof may be calculated using any known method. For example, a period from a time point earlier than the present moment by a predetermined period (e.g., by one second) until the present moment is indicated by "a". In this case, at each time point Ti (i=1, 2 . . . n) in the period "a", the moving speed (forward speed) of the vehicle calculated based on the output of the wheel speed sensor 7 is differentiated to calculate a movement acceleration Pi of the vehicle body at the time point Ti. Further, an acceleration Qi in the longitudinal direction of the vehicle body at the time point Ti is obtained from the G-sensor 5. Then, using the following expression, an inclination $\theta i$ at the time point Ti is calculated:

$$\theta i = \arcsin\left[(Qi - Pi)/g\right]$$

Then, the average of the inclinations $\theta i$ at the time points Ti (i=1, 2 . . . n) calculated in the period "a" may be used as the current inclination $\theta$ of the road surface directly beneath the vehicle in the longitudinal direction thereof. It should be noted that $\theta i$, Pi and Qi may take positive or negative values, in a similar manner to $\theta$, C and A.

The wheel speed sensor 7 outputs zero as a vehicle speed in an extremely low-speed area, i.e. in an area where the vehicle is on the verge of stopping, and thus the vehicle acceleration will also be necessarily zero. Accordingly, when the current inclination θ of the road surface directly beneath the vehicle in the longitudinal direction thereof is calculated using the value "zero", the calculation will result in an error. However, as will be described later, the inclination θ is used for the purpose of detecting a strong impact that is a collision of the vehicle. Therefore, the "error" is unlikely to cause a severe influence.

Also, for example, the CPU 14 includes a storage medium that stores map data in which gradients of roads at various points are recorded. Thus, the gradient of the road at the current location of the vehicle 10 may be read from the map data. Then, based on the read gradient of the road, the current inclination θ in the longitudinal direction of the road surface directly beneath the vehicle may be defined.

Subsequently, in step 110, the level of risk is calculated based on the longitudinal acceleration C calculated in step 100 to determine whether or not the level of risk is high. The expression "the level of risk is high" here refers to a situation where some object has collided with the vehicle 10, in a situation, as shown in FIG. 4, where a vehicle 20 running behind collides with the vehicle 10, or the vehicle 10 collides with a vehicle running ahead.

Figure 5:
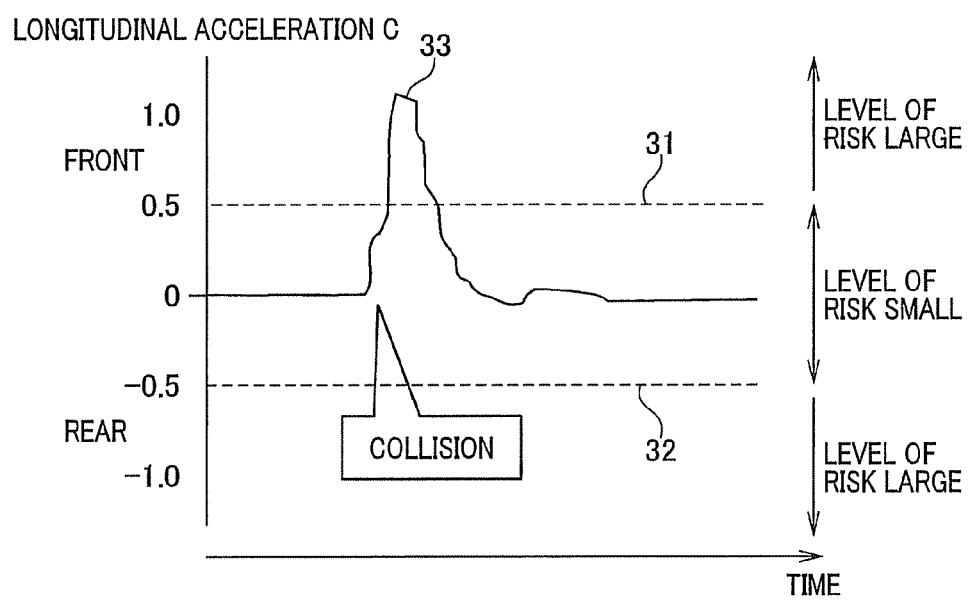
FIG. 5 is a graph illustrating an example of the variation of longitudinal acceleration of the vehicle at the time of collision.

The method for determining the level of risk may, for example, be a method in which an absolute value of the longitudinal acceleration C is determined to be larger or not larger than a predetermined acceleration threshold (e.g., 0.5 g). FIG. 5 is a graph illustrating an example of the variation of the longitudinal acceleration C at the time of collision. As shown in FIG. 5, when an obstacle has collided with the vehicle 10 from behind or ahead, the longitudinal acceleration C drastically changes as indicated by a line 33. Specifically, the longitudinal acceleration C is an amount reflecting the impact given to the vehicle from outside the vehicle. Thus, in step 110, it is determined whether or not an impact has been imposed on the vehicle from outside of the vehicle.

In order to detect the external impact, an acceleration threshold 31 (in addition to a value 32 which is obtained by inverting the plus/minus sign of the acceleration threshold 31) is set. When the longitudinal acceleration C has an absolute value larger than the acceleration threshold 31, the level of risk is determined to be high. Otherwise, the level of risk is determined to be low (not high).

If the level of risk is determined not to be high, the control proceeds to step 120. In step 120, the normal-state table 13a (corresponding to an example of the first candidate) is selected for use as a predetermined criteria data in determining the occurrence of an erroneous application of the accelerator. If the level of risk is determined to be high, the control proceeds to step 130. In step 130, the risky-state table 13b (corresponding to an example of the second candidate) is selected for use as a predetermined criteria data in determining the occurrence of an erroneous application of the accelerator.

Hereinafter, the details of the normal-state and risky-state tables 13a and 13b are described. The normal-state and risky-state tables 13a and 13b each indicate combinations of variation in accelerator opening (i.e. increase in accelerator opening per unit time) (hereinafter referred to as "accelerator opening variation") and accelerator opening, for each absolute value of each of a plurality of accelerator openings. Specifically, each of the tables is data indicating which of the combinations correspond to a state where the accelerator is erroneously applied, and which of the combinations correspond to a state where the accelerator is not erroneously applied.

Figure 6:
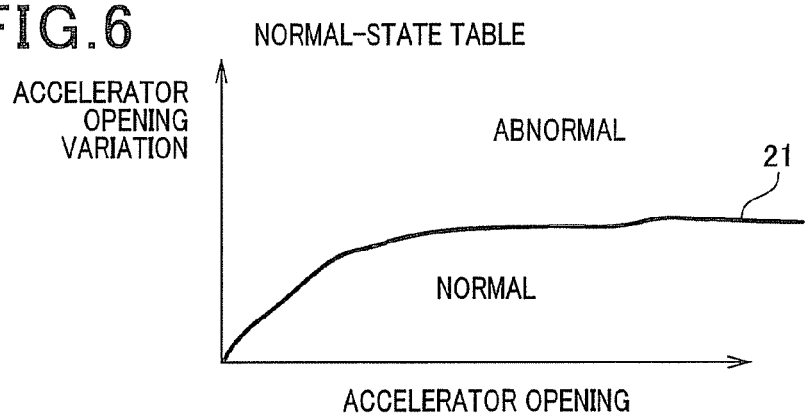
FIG. 6 is a schematic diagram illustrating a normal-state table.
Figure 7:
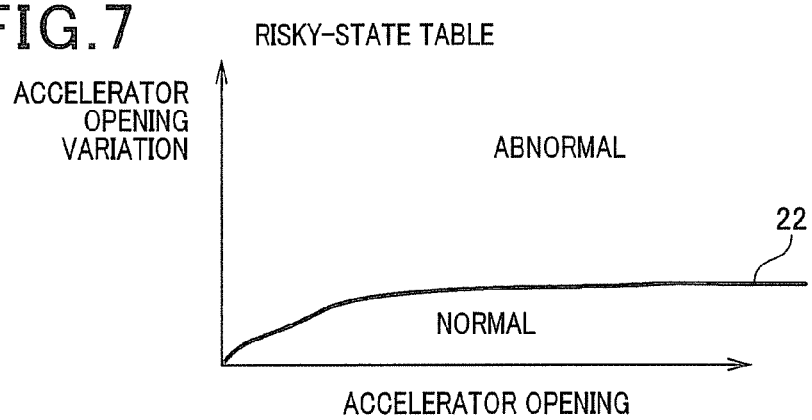
FIG. 7 is a schematic diagram illustrating a risky-state table.

FIG. 6 shows an example of discriminating an abnormal state (i.e. a state where the accelerator is erroneously applied) from a normal state (a state where the accelerator is not erroneously applied) based on the normal-state table 13a. FIG. 7 shows an example of discriminating an abnormal state from a normal state based on the risky-state table 13b.

In both of FIGS. 6 and 7, the vertical axis indicates accelerator opening variation and the horizontal axis indicates accelerator opening.

In the normal-state table 13a shown in FIG. 6, abnormal state is defined by the combinations of accelerator opening variation and accelerator opening in the area above a line 21, while normal state is defined by the combinations of accelerator opening variation and accelerator opening in the area below the line 21. In the risky-state table 13b shown in FIG. 7, abnormal state is defined by the combinations of accelerator opening variation and accelerator opening in the area above a line 22, while normal state is defined by the combinations of accelerator opening variation and accelerator opening in the area below the line 22.

In each of these tables 13a and 13b, when an accelerator opening is fixed, the accelerator opening variation at the fixed accelerator opening on the line 21 or 22 is the threshold of the accelerator opening variation (hereinafter also referred to as "threshold 21" or "threshold 22"). When the accelerator opening variation is larger than the threshold in each of the tables, the state corresponds to an abnormal state. On the other hand, when the accelerator opening variation is not more than the threshold in each of the tables, the state corresponds to a normal state. The threshold of the accelerator opening variation becomes higher as the accelerator opening becomes larger.

As will be understood from the comparison between the normal-state table 13a with the risky-state table 13b, when the same accelerator opening is concerned, the threshold 21 of accelerator opening variation in the normal-state table 13a is larger than the threshold 22 of accelerator opening variation in the risky-state table 13b. This applies to all of the accelerator openings except 0.

Accordingly, use of the risky-state table 13b broadens the range of accelerator opening variation, based on which the occurrence of an erroneous application of the accelerator is determined, compared to the use of the normal-state table 13a. At the same time, use of the risky-state table 13b also broadens the range of accelerator opening, based on which the occurrence of an erroneous application of the accelerator is determined, compared to the use of the normal-state table 13a. In addition, use of the risky-state table 13b also broadens the combination of accelerator opening and accelerator opening variation, based on which the occurrence of an erroneous application of the accelerator is determined, compared to the use of the normal-state table 13a.

The normal-state and risky-state tables 13a and 13b may be prepared in advance based on the results of experiments and may be stored in the ROM 13.

The actual data format used for the normal-state and risky-state tables 13a and 13b may be realized as follows. For example, a threshold of accelerator opening variation may be allocated to each of a plurality of accelerator openings. Alternatively, a threshold of accelerator opening may be allocated to each of a plurality of accelerator opening variations. Alternatively, a value indicating abnormality (erroneous application of accelerator) or normality may be allocated to each of a plurality of combinations of accelerator opening variation and accelerator opening.

Subsequent to step 120 or 130, the control proceeds to step 140. In step 140, an accelerator opening variation and the current accelerator opening are obtained based on the results of output from the accelerator pedal sensor 4. Then, the current accelerator opening variation and the current accelerator opening are applied to the normal-state or risky-state table 13a or 13b, which has been selected as predetermined criteria data, to thereby determine whether or not the accelerator has been erroneously applied.

For example, when the table selected as predetermined criteria data is realized by allocating a threshold of accelerator opening variation to each of a plurality of accelerator openings, the threshold of the accelerator opening variation corresponding to the current accelerator opening is read from the table. Then, the read threshold of the accelerator opening variation is compared with the current accelerator opening variation. If the current accelerator opening variation is larger, it is determined that the accelerator has been erroneously applied. Otherwise, it is determined that the accelerator has not been erroneously applied.

Accordingly, for example, following the collision of the vehicle 10 with an obstacle, while the absolute value of the longitudinal acceleration C does not exceed the acceleration threshold 31 (this value corresponds to the first value) as shown in FIG. 5, the level of risk is determined to be low (not to be high) in step 110. As a result, the normal-state table 13a is selected in step 120. Then, in step 140, it is determined whether or not the accelerator has been erroneously applied, using the selected normal-state table 13a.

After that, as shown in FIG. 4, when the vehicle 10 collides with an obstacle 20, and then, at the timing when the absolute value of the longitudinal acceleration C has changed to a value exceeding the acceleration threshold 31 (this value corresponds to the second value) as shown in FIG. 5, the level of risk is determined to be high at step 110. As a result, the risky-state table 13b is selected in step 130. Then, in step 140, it is determined whether or not the accelerator has been erroneously applied, using the selected risky-state table 13b.

When the vehicle 10 collides with the obstacle 20, the period for the absolute value of the longitudinal acceleration C to exceed the acceleration threshold 31 may be short. Accordingly, the risky-table 13b, once it has been selected, may be kept being selected for a predetermined period (e.g., 5 seconds).

Accordingly, when the same accelerator opening is concerned, once the level of risk is determined to be high, the range of accelerator opening variation, based on which the occurrence of an erroneous application of the accelerator is determined, is expanded compared to the range prior to the determination. Similarly, when the same accelerator opening variation is concerned, once the level of risk is determined to be high, the range of accelerator opening, based on which the occurrence of an erroneous application of the accelerator is determined, is expanded compared to the range prior to the determination.

For this reason, for the same actual combination of an accelerator opening variation and an accelerator opening, the accelerator is determined not to be erroneously applied when the normal-state table 13a is used, however, may be determined to be erroneously applied when the risky-state table 13b is used.

In step 140, if it is determined that the accelerator has not been erroneously applied, the process of FIG. 3 is directly ended. Thus, the determination apparatus 1 no longer outputs an instruction to the engine ECU 2. As a result, the engine ECU 2 requests an output to the engine, as usual, according to an accelerator opening obtained from the accelerator pedal sensor 4. Specifically, the engine ECU 2 drives an actuator for the control of an engine throttle opening. Under the control, the engine throttle opening is increased as the accelerator opening is increased.

In step 140, if it is determined that the accelerator has been erroneously applied, the control proceeds to step 150 where vehicle control intervention is performed in order to limit the behaviors of the vehicle. Specifically, the determination apparatus 1 (or the CPU 14) outputs an instruction for closing the throttle (throttle off) to the engine ECU 2 according to the accelerator opening obtained from the accelerator pedal sensor 4.

Figure 8:
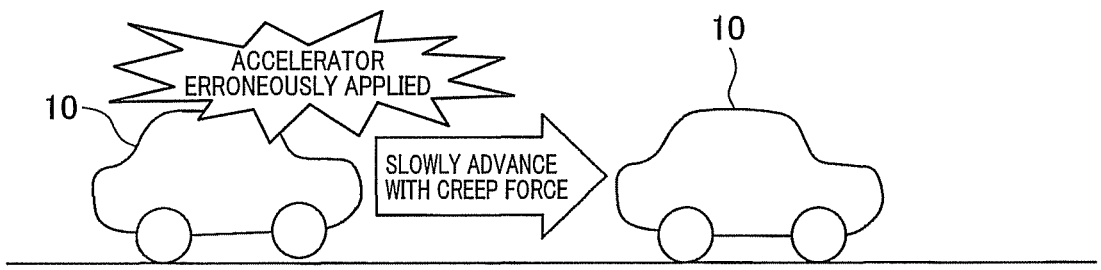
FIG. 8 is a schematic diagram illustrating the behavior of the vehicle installing the apparatus when the accelerator has been erroneously pressed.

Upon reception of the instruction, the engine ECU 2 neglects the output from the accelerator pedal sensor 4 and sets the engine throttle opening to a throttle opening suitable for idle speed. Thus, the engine is rotated at the idle speed. Thus, as shown in FIG. 8, the vehicle 10 advances slowly with a drive force that corresponds to a creep force. As a result, the vehicle is prevented from being abruptly accelerated. Once the occurrence of an erroneous application of the accelerator is determined in step 140, the instruction for closing the throttle may be continuously outputted to the engine ECU 2 until the accelerator opening obtained from the accelerator pedal 4 becomes zero, without relying on the determination result in step 140.

In step 150, an alarm is given to the driver from the alarm device 3. The alarm may be given in the form of an audio output, such as a chime or a warning message, or may be in the form of a character-string notation.

In this way, as the longitudinal acceleration C has a larger absolute value, i.e. as the impact given from outside is larger, the probability for the CPU 14 to determine the occurrence of an erroneous application of the accelerator becomes higher. Thus, only a little manipulation of the accelerator can be easily determined to be an erroneous application of the accelerator.

When an impact has been given to a vehicle, there is a low probability that the driver would intentionally press the accelerator compared with in a normal traveling. Therefore, the configuration described above enables more accurate detection of an erroneous application of the accelerator than in the conventional art.

The CPU 14 selects one of the normal-state and risky-state tables 13a and 13b according to the absolute value of the longitudinal acceleration C, for use as criteria data. The normal-state and risky-state tables 13a and 13b each define the range of accelerator opening variation for determining the occurrence of an erroneous application of the accelerator for each accelerator opening. Accordingly, a determination of the occurrence of an erroneous application of the accelerator is made with higher accuracy.

Second Embodiment

Figure 9:
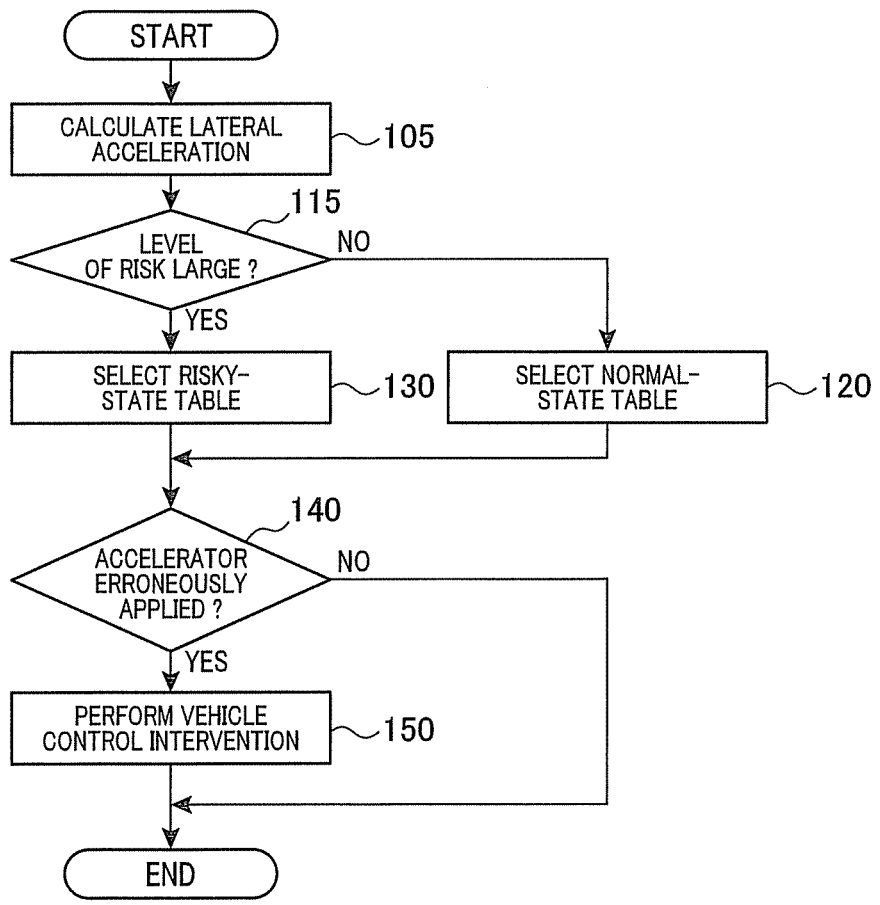
FIG. 9 is a flow diagram illustrating a process performed by a determination apparatus for determining erroneous application of an accelerator according to a second embodiment.
Figure 10:
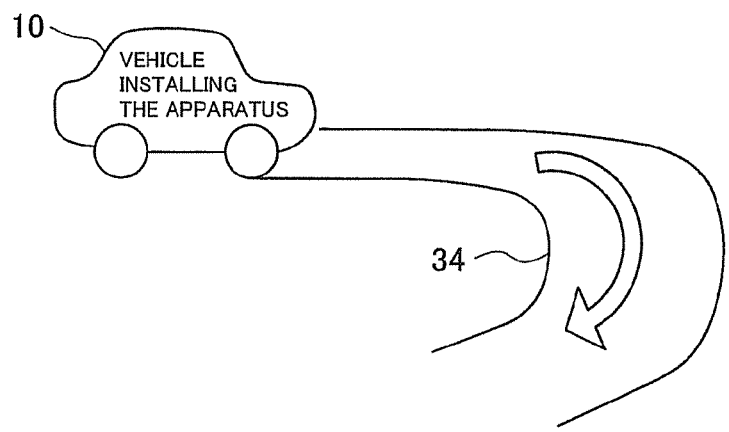
FIG. 10 is a schematic diagram illustrating a situation where the vehicle installing the apparatus enters a curve.
Figure 11:
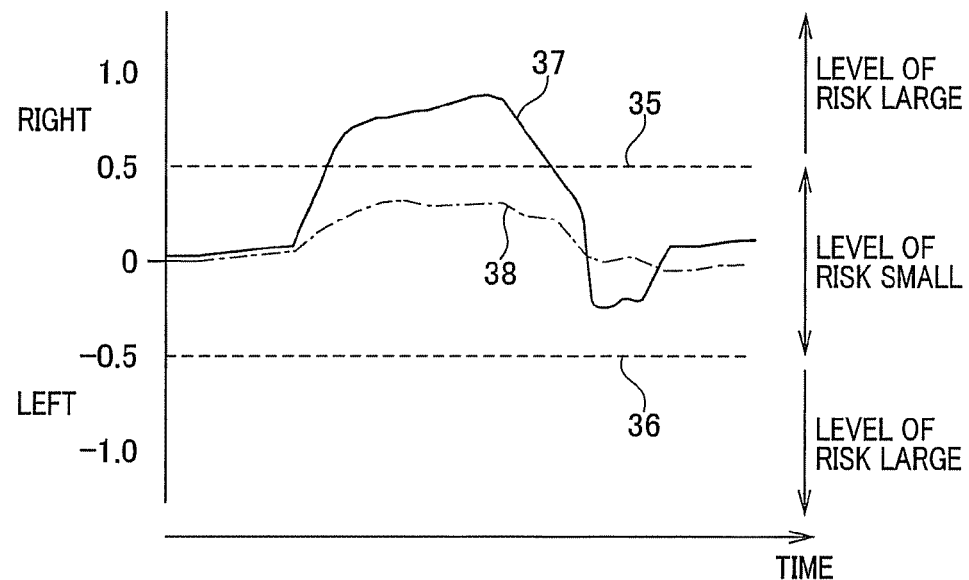
FIG. 11 is a graph illustrating accelerations applied in the lateral (left-and-right) direction of the vehicle body.

Referring now to FIGS. 9 to 11, hereinafter is described a second embodiment. It should be appreciated that, in the present embodiment as well as in the modifications described later, the components and steps identical with or similar to those in the first embodiment are given the same reference numerals for the sake of omitting unnecessary explanation. The description of the second embodiment is focused on the differences from the first embodiment. The second embodiment is different from the first embodiment in that a determination as to the level of risk is made based not on the longitudinal acceleration but based on the vehicle's lateral acceleration (hereinafter just referred to as "lateral acceleration").

The CPU 14 of the determination apparatus 1 in the present embodiment is ensured to repeatedly perform (e.g., at a cycle of 100 msec) a process of a flow diagram illustrated in FIG. 9, replacing the process of the flow diagram illustrated in FIG. 3. It should be appreciated that the hardware configuration of the determination apparatus 1 of the present embodiment is similar to that of the first embodiment.

First, in step 105, the CPU 14 calculates a lateral acceleration of the vehicle. Specifically, the CPU 14 obtains the current acceleration applied in the lateral direction (left-and-right direction) of the vehicle body, from the G-sensor 5 via the interface 11.

Subsequently, in step 115, the CPU 14 determines whether or not the level of risk is high based on the lateral acceleration calculated in step 105. The expression "level of risk is high" here refers to, as shown in FIG. 10, a situation where the vehicle 10 has entered a curve 34 at an excessively high speed.

In the process of determining the level of risk in the present embodiment, it is determined whether or not the absolute value of the lateral acceleration obtained in step 105 is larger than a predetermined acceleration threshold (e.g., 0.5 g).

FIG. 11 is a graph illustrating accelerations applied in the lateral (left-and-right) direction of the vehicle body. As shown in FIG. 11, when the vehicle has entered a curve at an excessively high speed, a higher centrifugal force is applied to the vehicle than usual. Accordingly, the lateral acceleration that is an amount reflecting the centrifugal force tends to have a larger absolute value, as indicated by a solid line 37, than in a normal entry into a curve (indicated by a dash-dot line 38).

In order to detect this, an acceleration threshold 35 (in addition to a value 36 which is obtained by inverting the plus/minus sign of the acceleration threshold 35) is set. If the absolute value of the lateral acceleration becomes larger than the acceleration threshold 35, the level of risk is determined to be high. Otherwise, the level of risk is determined to be low (not high).

If the level of risk is determined not to be high, the control proceeds to step 120. In step 120, the normal-state table 13*a* (corresponding an example of the first candidate) is selected for use as predetermined criteria data. If the level of risk is determined to be high, the control proceeds to step 130. In step 130, the risky-state table 13*b* (corresponding to an example of the second candidate) is selected for use as predetermined criteria data. The processings conducted in steps 120 and 130 or later is similar to those of the first embodiment.

Accordingly, for example, as far as an absolute value of the lateral acceleration does not exceed the acceleration threshold 35 (corresponding to the first value), the level of risk is determined to be low (not high) in step 115. Then, in step 120, the normal-state table 13*a* is selected, followed by making a determination, in step 140, as to the occurrence of an erroneous application of the accelerator, using the normal-state table 13*a*.

Also, for example, when the vehicle has entered a curve at an excessively high speed, the absolute value of the lateral acceleration may exceed the acceleration threshold 35 (corresponding to the second value) as indicated by the solid line 37 in FIG. 11. At the timing when the absolute value of the lateral acceleration has exceeded the acceleration threshold 35, it is determined, in step 115, that the level of risk is high. Then, in step 130, the risky-state table 13*b* is selected, followed by making a determination, in step 140, as to the occurrence of an erroneous application of the accelerator, using the risky-state table 13*b*.

Thus, when the same accelerator opening is concerned, once the level of risk is determined to be high, the range of accelerator opening variation, based on which the occurrence of an erroneous application of the accelerator is determined, is expanded compared to the range prior to the determination. Similarly, when the same accelerator opening variation is concerned, once the level of risk is determined to be high, the range of accelerator opening, based on which the occurrence of an erroneous application of the accelerator is determined, is expanded compared to the range prior to the determination.

For this reason, for the combination of the same accelerator opening variation and the same accelerator opening, the accelerator is determined not to be erroneously applied as far as the normal-state table 13*a* is used, but may be determined to be erroneously applied when the risky-state table 13*b* is used.

As described above, as the lateral acceleration has a larger absolute value, i.e. as the centrifugal force caused at a curve is larger, the probability for the CPU 14 to determine the occurrence of erroneous application of the accelerator becomes higher. Thus, only a little manipulation of the accelerator can be easily determined to be an erroneous application of the accelerator.

If the speed of entry into, a curve is higher than the driver's intention, there is a low probability that the driver would intentionally press the accelerator. Therefore, the configuration described above enables more accurate detection of an erroneous application of the accelerator than in the conventional art.

Also, the CPU 14 selects one of the normal-state and risky-state tables 13*a* and 13*b* according to the absolute value of the lateral acceleration, for use as criteria data. The normal-state and risky-state tables 13*a* and 13*b* each define the range of accelerator opening variation for each accelerator opening to determine the occurrence of an erroneous application of the accelerator. Accordingly, a determination of the occurrence of an erroneous application of the accelerator is made with higher accuracy.

In the present embodiment, the level of risk is also determined to be high in step 115 when the vehicle 10 is hit by an obstacle from its side. In this case as well, there is a low probability that the driver would intentionally press the accelerator compared with in a normal traveling. Therefore, the configuration described above enables more accurate detection of an erroneous application of the accelerator than in the conventional art.

Modifications

Some embodiments of the present invention have been described so far. However, the present invention is not limited only to the embodiments described above. The present invention may encompass those modifications which can realize the functions of the various aspects of the present invention. For example, the present invention encompasses the modifications as provided below.

(1) The determination apparatus 1 may have functions of both the first and second embodiments. In this case, the CPU 14 may perform steps 100 and 105. Then, the CPU 14 may perform both of the risk determination in step 110 and the risk determination in step 115. If the level of risk is determined to be high at either one of the steps, the control may proceed to step 130 to select the risky-state table 13*b*. Only when the level of risk is determined not to be high at both of the steps, the control may proceed to step 120 to select the normal-state table 13*a*.

(2) In the embodiments described above, the occurrence of an erroneous application of the accelerator is determined based on the combination of an accelerator opening variation and an accelerator opening. Alternatively, however, the occurrence of an erroneous application of the accelerator may be determined based on either one of an accelerator opening variation and an accelerator opening (an accelerator opening variation may be used or an accelerator opening may be used).

For example, when the occurrence of an erroneous application of the accelerator is determined only based on an accelerator opening variation, the erroneous application may be determined to have occurred when the detected accelerator opening variation is larger than a threshold. Also, the erroneous application may be determined not to have occurred when the detected accelerator opening variation is not larger than the threshold. In this case, the threshold may be made smaller continuously or stepwise as the longitudinal acceleration becomes higher. Alternatively, the threshold may be made smaller continuously as the lateral acceleration becomes higher.

(3) In the embodiments described above, the vehicle 10 uses the engine, which is an internal combustion engine, as a drive force generating mechanism for traveling. Alternatively, however, an electric motor may be used rather than the engine, as the drive force generating mechanism for traveling. In this case, if the accelerator is not erroneously applied, the actuator of the electric motor may be controlled such that the output torque of the electric motor becomes larger as the accelerator opening becomes larger. If the accelerator is erroneously applied, the output torque of the electric motor may be rendered to be zero or minimized (to the torque corresponding to idle speed) irrespective of the accelerator opening.

(4) In the second embodiment described above, the level of risk in step 115 of FIG. 9 may be determined to be high only when the driver is determined to be steering the vehicle based on the results of detection obtained from the steering angle sensor 6.

Specifically, in step 115, the CPU 14 may use the steering angle of the vehicle obtained from the steering angle sensor 6. The CPU 14 may determine whether or not the vehicle is cornering based, for example, on the comparison between the steering angle and a predetermined threshold angle.

Then, if the vehicle is determined not to be cornering, the level of risk may be determined not to be high irrespective of the absolute value of the lateral acceleration and the control may proceed to step 120. If the vehicle is determined to be cornering, the level of risk may be calculated through the process described above based on the lateral acceleration calculated in step 105. With this configuration, an accurate detection is ensured in a situation where the speed of entry into a curve has become higher than the driver's intention.

(5) In the second embodiment described above, criteria data is selected according to the lateral acceleration derived from the signal detected by the G-sensor 5. However, an alternative configuration may be used.

For example, whether or not the vehicle is cornering may be determined based on a steering angle of the vehicle. If the vehicle is determined to be cornering, the level of risk may be determined to be high, irrespective of the absolute value of the lateral acceleration, for the selection of the risky-state table 13*b*.

Specifically, the steering angle of the vehicle obtained from the steering angle sensor 6 may be used in step 115 of FIG. 9.

Then, whether or not the vehicle is cornering may be determined based on the obtained steering angle, e.g., based on the comparison between the steering angle and a predetermined threshold angle.

Then, if the vehicle is determined to be cornering (if the absolute value of the steering angle is larger than the threshold angle), the level of risk is determined to be high, irrespective of the absolute value of the lateral acceleration and the control may proceed to step 130. If the vehicle is determined not to be cornering, the level of risk is determined to be low and the control may proceed to step 120.

For example, the vehicle may enter a curve having a low road surface frictional coefficient at a high speed and the driver may steer the vehicle to cause skidding. In such a case where the lateral acceleration may be low due to the skidding, the above configuration can determine the level of risk to be high.

(6) In the embodiments described above, the various functions are realized with the execution of the programs by the CPU 14. Alternatively, the various functions may be realized using hardware having the functions (e.g., FPGA (field-programmable grid array) that enables programming of circuit configurations).

Hereinafter, aspects of the above-described embodiments will be summarized.

As an aspect of the embodiment, a determination apparatus is provided which is installed in a vehicle and determines occurrence of an erroneous application of an accelerator, the apparatus including: a longitudinal acceleration calculation unit which obtains acceleration applied in the longitudinal direction of a body of the vehicle based on a signal from a G-sensor installed in the vehicle, removes an acceleration component corresponding to gravity from the obtained acceleration applied in the longitudinal direction, and regards the resultant value as longitudinal acceleration; a selection unit which selects criteria data, when considering a first case where the absolute value of the longitudinal acceleration is a first value and a second case where the absolute value of the longitudinal acceleration is a second value larger than the first value, so that a range of accelerator opening variation by which occurrence of an erroneous application of the accelerator is determined or a range of accelerator opening by which occurrence of an erroneous application of the accelerator is determined in the second case becomes larger than that in the first case; and a determination unit which determines whether or not the accelerator has been erroneously applied, by applying the current variation in the accelerator opening or the current accelerator opening to the selected criteria data.

Thus, the current variation in the accelerator opening (hereinafter referred to as "accelerator opening variation") or the current accelerator opening is applied to criteria data to determine whether or not the accelerator has been erroneously applied instead of the brake. On this premise, the acceleration applied in the longitudinal direction of the vehicle body is obtained based on a signal from the G-sensor installed in the vehicle. Then, the acceleration component corresponding to gravity is removed from the obtained acceleration applied in the longitudinal direction, and the resultant value is regarded to be the acceleration in the movement of the vehicle body in its longitudinal direction (hereinafter this acceleration is referred to as "longitudinal acceleration"). The longitudinal acceleration indicates an amount reflecting an impact imposed on the vehicle from outside.

As the absolute value of the longitudinal acceleration becomes larger, i.e. as the impact becomes larger, the probability of determining the occurrence of erroneous application of the accelerator becomes higher. Thus, only a little manipulation of the accelerator can be easily determined to be an erroneous application of the accelerator.

When an impact is imposed on a vehicle, the driver will have a low probability of intentionally pressing the accelerator compared with in a normal traveling. Therefore, the configuration described above enables more accurate detection of an erroneous application of the accelerator than in the conventional art.

The determination apparatus further includes a storage medium which stores a plurality of candidates for the criteria data as data indicating which combinations correspond to a state where the accelerator is erroneously applied, and which combinations correspond to a state where the accelerator is not erroneously applied, each of the combinations including variation in accelerator opening and accelerator opening. The selection unit uses a first candidate of the plurality of candidates as the criteria data when the absolute value of the longitudinal acceleration is the first value, and uses a second candidate of the plurality of candidates as the criteria data when the absolute value of the longitudinal acceleration is the second value. Each of the first candidate and the second candidate has a range of accelerator opening variation, by which occurrence of an erroneous application of the accelerator is determined, and which is large with respect to a certain accelerator opening.

Thus, the range of accelerator opening variation, based on which the occurrence of an erroneous application of the accelerator is determined, is defined for each accelerator opening. In this way, more accurate determination is made regarding the occurrence of an erroneous application of the accelerator.

As another aspect of the embodiment, a determination apparatus is provided which includes: a lateral acceleration calculation unit which calculates lateral acceleration which is applied in the lateral direction of a body of the vehicle body; a selection unit which selects criteria data, when considering a first case where the absolute value of the lateral acceleration is a first value and a second case where the absolute value of the lateral acceleration is a second value larger than the first value, so that a range of accelerator opening variation by which occurrence of an erroneous application of the accelerator is determined or a range of accelerator opening by which occurrence of an erroneous application of the accelerator is determined in the second case becomes larger than that in the first case; and a determination unit which determines whether or not the accelerator has been erroneously applied by applying the current variation in the accelerator opening or the current accelerator opening to the selected criteria data.

Thus, the current accelerator opening variation or the current accelerator opening is applied to predetermined criteria data. In this way, the acceleration applied to the vehicle from its lateral direction (hereinafter this acceleration is referred to as "lateral acceleration") is obtained, on the premise that a determination is made as to the occurrence of an erroneous application of the accelerator rather than the brake. The absolute value of the lateral acceleration indicates an amount reflecting the centrifugal force imposed on the vehicle on a curved road.

As the absolute value of the lateral acceleration becomes larger, i.e. as the centrifugal force imposed on the vehicle at a curve becomes larger, the probability of determining the occurrence of an erroneous application of the accelerator becomes higher. Thus, only a little manipulation of the accelerator can be easily determined to be an erroneous application of the accelerator.

If the speed of entry into a curve is higher than the driver's intention, there is a low probability that the driver would intentionally press the accelerator. Therefore, the configuration described above enables more accurate detection of an erroneous application of the accelerator than in the conventional art.

In the determination apparatus, the selection unit determines whether or not the vehicle is cornering based on a steering angle of the vehicle. The selection unit selects the criteria data, if the vehicle is cornering, so that a range of accelerator opening variation by which occurrence of an erroneous application of the accelerator is determined or a range of accelerator opening by which occurrence of an erroneous application of the accelerator is determined in the second case becomes larger than that in the first case. The selection unit selects the criteria data, if the vehicle is not cornering, irrespective of the absolute value of the lateral acceleration.

According to this configuration, an accurate detection is ensured in a situation where the speed of entry into a curve has become higher than the driver's intention.

The determination apparatus further includes a storage medium which stores a plurality of candidates for the criteria data as data indicating which combinations correspond to a state where the accelerator is erroneously applied, and which combinations correspond to a state where the accelerator is not erroneously applied, each of the combinations including variation in accelerator opening and accelerator opening. The selection unit uses a first candidate of the plurality of candidates as the criteria data when the absolute value of the lateral acceleration is the first value, and uses a second candidate of the plurality of candidates as the criteria data when the absolute value of the lateral acceleration is the second value. Each of the first candidate and the second candidate has a range of accelerator opening variation, by which occurrence of an erroneous application of the accelerator is determined, and which is large with respect to a certain accelerator opening.

Thus, the range of accelerator opening variation, based on which the occurrence of an erroneous application of the accelerator is determined, is defined for each accelerator opening. In this way, higher accuracy is ensured in making a determination as to the occurrence of an erroneous application of the accelerator.

As another aspect of the embodiment, a determination apparatus is provided which is installed in a vehicle and determines occurrence of an erroneous application of an accelerator, the apparatus including: a selection unit which determines whether or not the vehicle is cornering based on a steering angle of the vehicle, and selects criteria data, if the vehicle is cornering, so that a range of accelerator opening variation by which occurrence of an erroneous application of the accelerator is determined or a range of accelerator opening by which occurrence of an erroneous application of the accelerator is determined becomes larger; and a determination unit which determines whether or not the accelerator has been erroneously applied by applying the current variation in the accelerator opening or the current accelerator opening to the selected criteria data.

Therefore, the configuration described above enables more accurate detection of an erroneous application of the accelerator than in the conventional art.

As another aspect of the embodiment, a determination apparatus is provided which is installed in a vehicle and determines occurrence of an erroneous application of an accelerator, the apparatus including: an impact determination unit which determines whether or not an impact is imposed on the vehicle from outside, based on a signal from a G-sensor installed in the vehicle; a selection unit which selects criteria data, when considering a first case where the impact determination unit determines that an impact is not imposed on the vehicle from outside and a second case where the impact determination unit determines that an impact is imposed on the vehicle, so that a range of accelerator opening variation by which occurrence of an erroneous application of the accelerator is determined or a range of accelerator opening by which occurrence of an erroneous application of the accelerator is determined in the second case becomes larger than that in the first case; and a determination unit which determines whether or not the accelerator has been erroneously applied, by applying the current variation in the accelerator opening or the current accelerator opening to the selected criteria data.

For example, the vehicle may enter a curve having a low road surface frictional coefficient at a high speed and the driver may steer the vehicle to cause skidding. In such a case where the lateral acceleration may be low due to the skidding, the configuration described above enables more accurate detection of an erroneous application of the accelerator than in the conventional art.

What is claimed is:

1. A determination apparatus which is installed in a vehicle and determines occurrence of an erroneous application of an accelerator, comprising:
    a longitudinal acceleration calculation unit which obtains acceleration applied in the longitudinal direction of a body of the vehicle based on a signal from a G-sensor installed in the vehicle, removes an acceleration component corresponding to gravity from the obtained acceleration applied in the longitudinal direction, and regards the resultant value as longitudinal acceleration;
    a selection unit which selects criteria data, when considering a first case where the absolute value of the longitudinal acceleration is a first value and a second case where the absolute value of the longitudinal acceleration is a second value larger than the first value, so that a range of accelerator opening variation by which occurrence of an erroneous application of the accelerator is determined or a range of accelerator opening by which occurrence of an erroneous application of the accelerator is determined in the second case becomes larger than that in the first case; and
    a determination unit which determines whether or not the accelerator has been erroneously applied, by applying the current variation in the accelerator opening or the current accelerator opening to the selected criteria data; wherein
    the criteria data remains selected for a predetermined period of time; and
    the criteria data is selected from a table that allocates a threshold of accelerator opening variation to each of a plurality of accelerator openings.

2. The determination apparatus according to claim 1, further comprising a storage medium which stores a plurality of candidates for the criteria data as data indicating which combinations correspond to a state where the accelerator is erroneously applied, and which combinations correspond to a state where the accelerator is not erroneously applied, each of the combinations including variation in accelerator opening and accelerator opening, wherein
    the selection unit uses a first candidate of the plurality of candidates as the criteria data when the absolute value of the longitudinal acceleration is the first value, and uses a second candidate of the plurality of candidates as the criteria data when the absolute value of the longitudinal acceleration is the second value, and
    each of the first candidate and the second candidate has a range of accelerator opening variation, by which occurrence of an erroneous application of the accelerator is determined, and which is large with respect to a certain accelerator opening.

3. The determination apparatus according to claim 1, wherein the criteria data includes at least one value greater than zero.

4. The determination apparatus according to claim 1, wherein the predetermined period of time is greater than one second.

5. A determination apparatus which is installed in a vehicle and determines occurrence of an erroneous application of an accelerator, comprising:
    a lateral acceleration calculation unit which calculates lateral acceleration which is applied in the lateral direction of a body of the vehicle;
    a selection unit which selects criteria data, when considering a first case where the absolute value of the lateral acceleration is a first value and a second case where the absolute value of the lateral acceleration is a second value larger than the first value, so that a range of accelerator opening variation by which occurrence of an erroneous application of the accelerator is determined or a range of accelerator opening by which occurrence of an erroneous application of the accelerator is determined in the second case becomes larger than that in the first case; and
    a determination unit which determines whether or not the accelerator has been erroneously applied by applying the current variation in the accelerator opening or the current accelerator opening to the selected criteria data; wherein
    the criteria data remains selected for a predetermined period of time; and
    the criteria data is selected from a table that allocates a threshold of accelerator opening variation to each of a plurality of accelerator openings.

6. The determination apparatus according to claim 5, wherein
    the selection unit determines whether or not the vehicle is cornering based on a steering angle of the vehicle,
    the selection unit selects the criteria data, if the vehicle is cornering, so that a range of accelerator opening variation by which occurrence of an erroneous application of the accelerator is determined or a range of accelerator opening by which occurrence of an erroneous application of the accelerator is determined in the second case becomes larger than that in the first case, and
    the selection unit selects the criteria data when considering the first case, if the vehicle is not cornering, irrespective of the absolute value of the lateral acceleration.

7. The determination apparatus according to claim 5, further comprising a storage medium which stores a plurality of candidates for the criteria data as data indicating which combinations correspond to a state where the accelerator is erroneously applied, and which combinations correspond to a state where the accelerator is not erroneously applied, each of the combinations including variation in accelerator opening and accelerator opening, wherein
    the selection unit uses a first candidate of the plurality of candidates as the criteria data when the absolute value of the lateral acceleration is the first value, and uses a second candidate of the plurality of candidates as the criteria data when the absolute value of the lateral acceleration is the second value, and each of the first candidate and the second candidate has a range of accelerator opening variation, by which occurrence of an erroneous application of the accelerator is determined, and which is large with respect to a certain accelerator opening.

8. The determination apparatus according to claim 5, wherein the criteria data includes at least one value greater than zero.

9. The determination apparatus according to claim 5, wherein the predetermined period of time is greater than one second.

10. A determination apparatus which is installed in a vehicle and determines occurrence of an erroneous application of an accelerator, comprising:
 a selection unit which determines whether or not the vehicle is cornering based on a steering angle of the vehicle, and selects criteria data, if the vehicle is cornering, so that a range of accelerator opening variation by which occurrence of an erroneous application of the accelerator is determined or a range of accelerator opening by which occurrence of an erroneous application of the accelerator is determined becomes larger; and
 a determination unit which determines whether or not the accelerator has been erroneously applied by applying the current variation in the accelerator opening or the current accelerator opening to the selected criteria data; wherein
 the criteria data remains selected for a predetermined period of time; and
 the criteria data is selected from a table that allocates a threshold of accelerator opening variation to each of a plurality of accelerator openings.

11. The determination apparatus according to claim 10, wherein the criteria data includes at least one value greater than zero.

12. The determination apparatus according to claim 10, wherein the predetermined period of time is greater than one second.

13. A determination apparatus which is installed in a vehicle and determines occurrence of an erroneous application of an accelerator, comprising:
 an impact determination unit which determines whether or not an impact is imposed on the vehicle from outside, based on a signal from a G-sensor installed in the vehicle;
 a selection unit which selects criteria data, when considering a first case where the impact determination unit determines that an impact is not imposed on the vehicle from outside and a second case where the impact determination unit determines that an impact is imposed on the vehicle, so that a range of accelerator opening variation by which occurrence of an erroneous application of the accelerator is determined or a range of accelerator opening by which occurrence of an erroneous application of the accelerator is determined in the second case becomes larger than that in the first case; and
 a determination unit which determines whether or not the accelerator has been erroneously applied, by applying the current variation in the accelerator opening or the current accelerator opening to the selected criteria data; wherein
 the criteria data remains selected for a predetermined period of time; and
 the criteria data is selected from a table that allocates a threshold of accelerator opening variation to each of a plurality of accelerator openings.

14. The determination apparatus according to claim 13, wherein the criteria data includes at least one value greater than zero.

15. The determination apparatus according to claim 13, wherein the predetermined period of time is greater than one second.

* * * * *